US011453257B2

(12) United States Patent
Avalur Nagarajan et al.

(10) Patent No.: US 11,453,257 B2
(45) Date of Patent: Sep. 27, 2022

(54) TIRE PRESSURE MONITORING ADAPTER FOR OFF-HIGHWAY WHEELS

(71) Applicant: WHEELS INDIA LIMITED, Chennai (IN)

(72) Inventors: Balaji Avalur Nagarajan, Chennai (IN); Prasanna Gobinathan, Chennai (IN)

(73) Assignee: WHEELS INDIA LIMITED, Chennai (IN)

(*) Notice: Subject to any disclaimer, the term of this patent is extended or adjusted under 35 U.S.C. 154(b) by 133 days.

(21) Appl. No.: 16/624,924

(22) PCT Filed: May 10, 2018

(86) PCT No.: PCT/IB2018/053240
§ 371 (c)(1),
(2) Date: Dec. 20, 2019

(87) PCT Pub. No.: WO2019/175642
PCT Pub. Date: Sep. 19, 2019

(65) Prior Publication Data
US 2021/0402833 A1    Dec. 30, 2021

(30) Foreign Application Priority Data

Mar. 16, 2018 (IN) .............................. 201841009651

(51) Int. Cl.
*B60C 23/04* (2006.01)
(52) U.S. Cl.
CPC ...... *B60C 23/0494* (2013.01); *B60C 23/0447* (2013.01); *B60C 23/0498* (2013.01); *B60C 2200/065* (2013.01)

(58) Field of Classification Search
CPC ............ B60C 23/0494; B60C 23/0447; B60C 23/0498; B60C 2200/065; B60C 23/0496
USPC .................................... 701/36; 340/442, 447
See application file for complete search history.

(56) References Cited

U.S. PATENT DOCUMENTS

| 4,816,802 A | * | 3/1989 | Doerksen | ............ | B60C 23/0433 |
| | | | | | 340/447 |
| 5,556,489 A | * | 9/1996 | Curlett | .................. | B60C 23/133 |
| | | | | | 417/233 |
| 5,770,797 A | * | 6/1998 | Lapohn | ................... | B60C 23/02 |
| | | | | | 73/146.8 |
| 5,774,048 A | * | 6/1998 | Achterholt | .......... | B60C 23/0494 |
| | | | | | 340/447 |
| 7,089,147 B1 | * | 8/2006 | Chang | ................. | B60C 23/0408 |
| | | | | | 340/447 |

(Continued)

*Primary Examiner* — Eric Blount

(57) ABSTRACT

The present invention provides an adapter 104 for monitoring tire 101 pressure level of an off-highway vehicle wheel or earthmoving vehicle wheel through wireless communication. The adapter comprises of a sensor housing 201, wherein the sensor housing 201 includes a sensor module 205, an internal gallery 303 and a battery 206. The sensor housing 201 further includes a male portion 202 with external threads 203 for mounting the adapter 104 in a standard hole 105 of a rim 103 to face tire cavity region 102 of the rim 103, a female threaded hole arrangement 204 to receive a valve core housing 301 and/or a tire inflation valve. The internal gallery 303 provided to establish connectivity between the sensor module 205, tire inflation valve 301 and tire cavity 102.

12 Claims, 9 Drawing Sheets

(56) References Cited

U.S. PATENT DOCUMENTS

| | | | | |
|---|---|---|---|---|
| 7,741,963 B2* | 6/2010 | Tsai | ............... | B60C 23/0483 |
| | | | | 340/447 |
| 8,098,146 B2* | 1/2012 | Petrucelli | ............ | B60C 23/0496 |
| | | | | 340/447 |
| 8,516,882 B2* | 8/2013 | Rigney | ............... | B60C 23/0494 |
| | | | | 73/146.8 |
| 8,567,241 B2* | 10/2013 | Falkenborg | ......... | B60C 23/0494 |
| | | | | 73/146.8 |
| 8,763,449 B2* | 7/2014 | Hu | ............... | B60C 23/0493 |
| | | | | 73/146.5 |
| 10,919,346 B2* | 2/2021 | Jordan | ............... | G01L 19/147 |
| 2004/0031316 A1* | 2/2004 | Lundqvist | ............ | B60C 23/0496 |
| | | | | 73/146 |
| 2006/0061463 A1* | 3/2006 | Wilson, II | ............ | B60C 23/0408 |
| | | | | 73/146 |
| 2006/0173648 A1* | 8/2006 | Chang | ............... | B60C 23/0498 |
| | | | | 702/138 |
| 2006/0272402 A1* | 12/2006 | Yin | ............... | B60C 23/0452 |
| | | | | 73/146.8 |
| 2008/0284576 A1* | 11/2008 | Zhou | ............... | B60C 23/0496 |
| | | | | 340/442 |
| 2015/0183278 A1* | 7/2015 | Jankowski | ........... | B60C 23/0494 |
| | | | | 29/729 |
| 2017/0267038 A1* | 9/2017 | Li | ............... | B60C 23/0494 |

\* cited by examiner

TIRE PRESSURE MONITORING ADAPTER FOR OFF-HIGHWAY WHEELS

FIELD OF INVENTION

The embodiments herein generally relate to tire pressure monitoring systems. More particularly, the invention relates to a wheel mounted adapter for monitoring tire pressure of an off-highway construction vehicle wheel or an earthmoving vehicle wheel through wireless communication.

BACKGROUND AND PRIOR ART

In general, a tire pressure monitoring system (TPMS) is basically a system that is electronic in nature and is designed to be able to monitor the amount and consistency of air pressure prevalent on the inside of pneumatic tires on any sort of vehicles. It is a known fact that a pneumatic tire's dynamic behavioral mechanism is closely associated with that of its inflation pressure. The air pressure in the vehicle pneumatic tires should be maintained within a particular range to protect against tire damage or failure and to promote safe and efficient operation of the vehicle. For an example over inflated or under inflated tires may cause wear, internal tire damage and increased risk of tire penetration by sharp objects, tire blow outs and/or reduced fuel economy. The system is generally designed to be able to report information with regard to real-time tire pressure to the driver, usually via a pictogram display and to generate an alert if the tire pressure falls outside of the desirable range for the tire. This system is available to be included both at the factory level as well as an aftermarket solution.

The tire pressure system can be operated in two different ways either by measuring the pressure directly through pressure sensor or by relying on speed sensors attached to the wheels. The direct tire pressure monitoring system typically relies on the pressure monitoring sensors installed inside each tire so as to be able to provide very accurate data in reference to the same and provide a comparatively better output than the indirect mechanism which relies on the wheel speed sensors.

A TPMS module may incorporate a sensor attached to the tire or wheel rim and means for transmitting the pressure information to a receiver. In addition to that, the tire pressure monitoring system can be positioned either externally or internally.

In the prior art U.S. Pat. No. 8,373,551, a pressure sensor module is installed inside the tire. The pressure sensor module configured for transmitting the pressure data by wireless RF signal to the monitor located in the driver compartment of the vehicle is disclosed. But with this method the system installation and battery replacement may be very inconvenient. Also the signal transmission is weak and blocked by the steel belts embedded inside the tire.

In another prior art U.S. Pat. No. 8,567,241, a pressure sensing and transmission device is mounted in the inner end of the tire valve. In this method also battery replacement would be inconvenient. Also this arrangement is not suitable for earth moving and construction vehicle rims which are having flat base and no well. As a result, the mounting and removal of tires would be inconvenient.

In another prior art US 2009/0058667, a pressure sensor is secured to the inside of the tire surface by a patch. In this method the rotation of the tire from one position to other on the vehicle becomes tedious as it involves recalibration or removal and pasting the patch on the new tire in the field.

In some other prior art U.S. Pat. No. 7,441,452 B2, a pressure sensor is removably attached to the wheel and secured by a band and buckle. The assembly and removal of tires becomes tedious and care to be taken to avoid damages to sensor during such operations.

In yet another prior art familiar to those in this trade, a pressure sensor is mounted on the valve stem outside the tire. This method has the advantages of easy installation and good signal transmission. With this method, user must remove the sensor to refill the tire with air and then reinstall the sensor back on the valve stem. In addition to the inconvenience, frequent sensor removal and reinstallation would damage the air seal and cause air leak, thereby creating safety hazard for the user. Also this design does not ensure protection against the sensor theft in the field.

Therefore, there is a need to develop a Tire Pressure Monitoring System or an adaptor for monitoring tire pressure wirelessly and thereby easily attachable to a standard hole of a rim of the earthmoving or construction vehicle wheel. Further, there is a need to develop a simple and relatively less expensive adapter for monitoring tire pressure level.

OBJECTS OF THE INVENTION

Some of the objects of the present disclosure are described herein below:

A main object of the present invention is to provide an adapter externally that are mountable on a standard hole of a rim in such a way that to place a sensor module outside a tire cavity for monitoring tire pressure of an earthmoving or off-highway vehicle wheel.

Another object of the present invention is to provide an adapter that are securely mountable and has an anti-theft protection to the sensor module.

Still another object of the present invention is to provide an adapter that utilizes a reliable RF signal transmission from the sensor module without a need for an external antenna as the sensor module are placed outside the tire cavity.

Yet another object of the present invention is to provide an adapter that has a hassle free assembly.

Another object of the present invention is to provide an adapter that allows a user to remove the tire easily over the rim without any damage to the sensor.

Another object of the present invention is to provide an adapter that facilitates easy tire rotation without the need for location sensing of tires.

Another object of the present invention is to provide an adapter that facilitates easy removal and replacement of the battery without the need for removal of tires.

Another object of the invention is to provide an adaptor with a female threaded hole arrangement to receive a valve core housing and/or tire inflation valve and thereby eliminating the need for separate holes on the rim for holding the TPM adaptor and the tire inflation valve.

Another object of the invention is to provide an adapter that is available to be included at the factory level as well as an aftermarket solution.

According to the space and other practical constraints, various modifications may occur to those skilled in the art without departing from the true scope and spirit of this invention.

The other objects and advantages of the present invention will be apparent from the following description when read in conjunction with the accompanying drawings, which are incorporated for illustration of preferred embodiments of the present invention and are not intended to limit the scope thereof.

SUMMARY OF THE INVENTION

In view of the foregoing, an embodiment herein provides an adapter for monitoring tire pressure level of an off-highway vehicle wheel and/or earthmoving vehicle wheel through wireless communication. The adapter comprises of a sensor housing, wherein said sensor housing includes a sensor module, an internal gallery and a battery. According to an embodiment, the sensor housing further includes a male portion with external threads for mounting the adapter in a standard hole of a rim to face tire cavity region of the rim and a female threaded hole arrangement to receive a valve core housing and/or a tire inflation valve. The internal gallery is provided to establish connectivity between the sensor module, the tire inflation valve and the tire cavity. The sensor housing further includes at least two compartments for embedding the sensor module and the battery separately.

According to an embodiment, the sensor module compartment includes a stepped hole, a grommet, a filter, a rectangular recess, a sealing element and sensor electronic parts. According to an embodiment, the sensor electronic parts includes a microcontroller with plurality of sensor and/or sensor chip, an antenna, a radio frequency matching circuit, a signal conditioning unit, leads for connecting to said battery and a common printed circuit board. The sensor module compartment is connected to a cross hole provided in the internal gallery through the stepped hole provided at top of the sensor module compartment.

According to an embodiment, the filter and the grommet are attached and connected together to a counter bore of the stepped hole and thereby providing tight seal and protection for the sensor electronic parts from contaminants present in the inflated air.

According to an embodiment, the microcontroller with plurality of sensors or sensor chip, the radio frequency matching circuit and the signal conditioning unit are mounted on the common printed circuit board on a side facing the cross hole and the antenna positioned on other side of the printed circuit board and together mounted over a surface inside the sensor module compartment and potted using a suitable epoxy based resin.

According to an embodiment, the rectangular recess provided along boundary of the grommet and the microcontroller and thereby acts as a protective frame for the microcontroller.

According to an embodiment, at least two ribs rise vertically from bottom of the rectangular recess creating a gap along walls of the rectangular recess and allow positioning of the sealing element into the gap and thereby preventing the epoxy based resin entering the rectangular recess.

According to an embodiment, the battery compartment includes an internal thread for receiving a threaded lid and a groove provided beneath the internal thread to receive a static seal. According to an embodiment, the leads for connecting to the battery are taken from the printed circuit board and runs through an internal hole connecting the sensor compartment and the battery compartment.

According to an embodiment, the valve core housing and/or the tire inflation valve includes a swivel nut for establishing a tight seal between the valve core housing and/or the tire inflation valve and the female threaded hole arrangement of the sensor housing. According to an embodiment, the adapter is connected to the standard hole of the rim through a spud. According to an embodiment, the spud includes internal threads to receive the external threads of the male portion of the sensor housing and external threads to match internal threads of a lock nut provided beneath the spud. The adapter enters into the spud and secured by driving a set screw at a mating thread interface between the spud and external threads of the sensor housing.

According to an embodiment, a seal is disposed at a chamfer of the spud to provide an air tight seal between the spud and the sensor housing interface. According to an embodiment, a rubber grommet is placed over an external step of the spud.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE PREFERRED EMBODIMENTS

Figure 1:
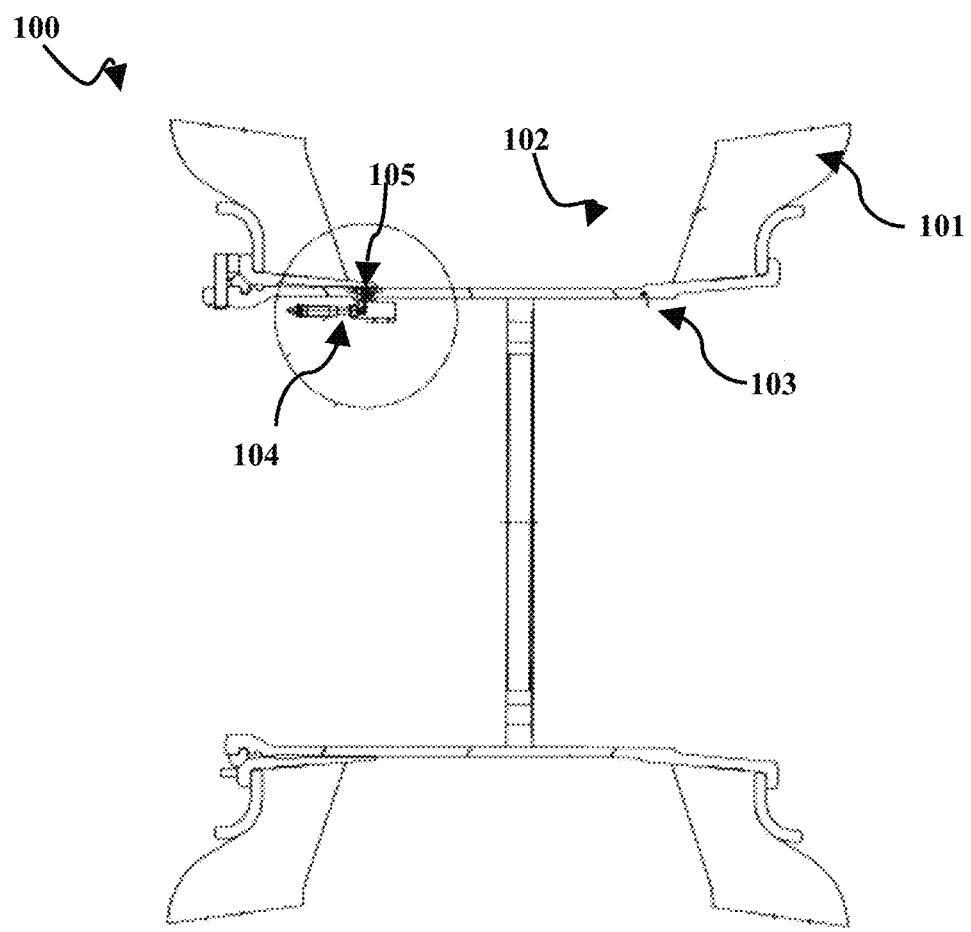
FIG. 1 illustrates a cross section view of a rim, according to an embodiment of the present invention herein.
Figure 2:
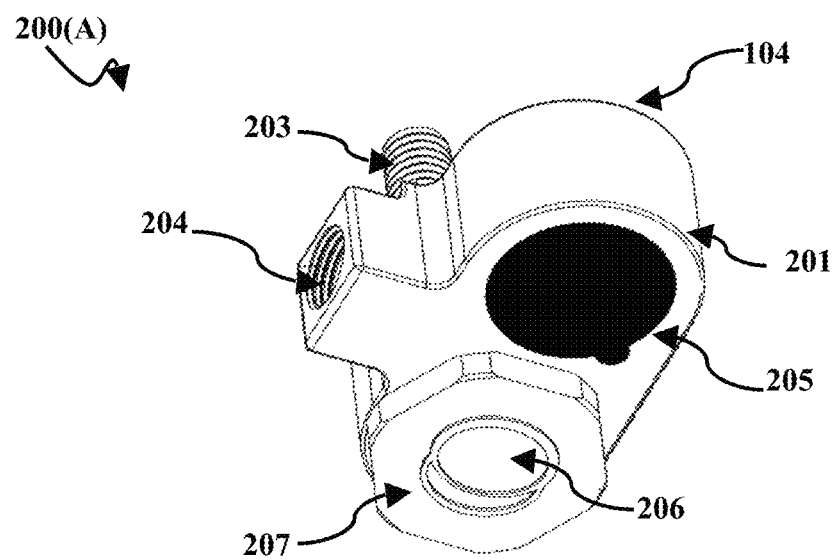
FIG. 2(A) illustrates a pictorial view of an adapter, according to an embodiment of the present invention herein.
FIG. 2(B) illustrates another pictorial view of an adapter, according to an embodiment of the present invention herein.
Figure 2:
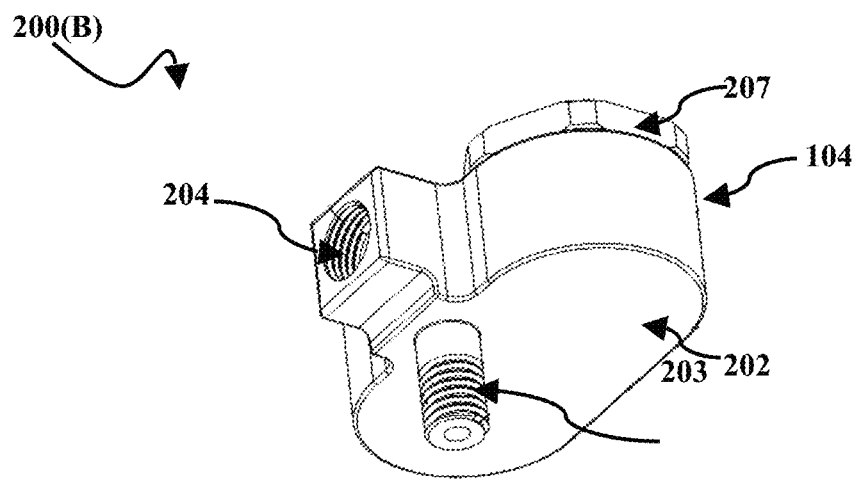
Figure 3:
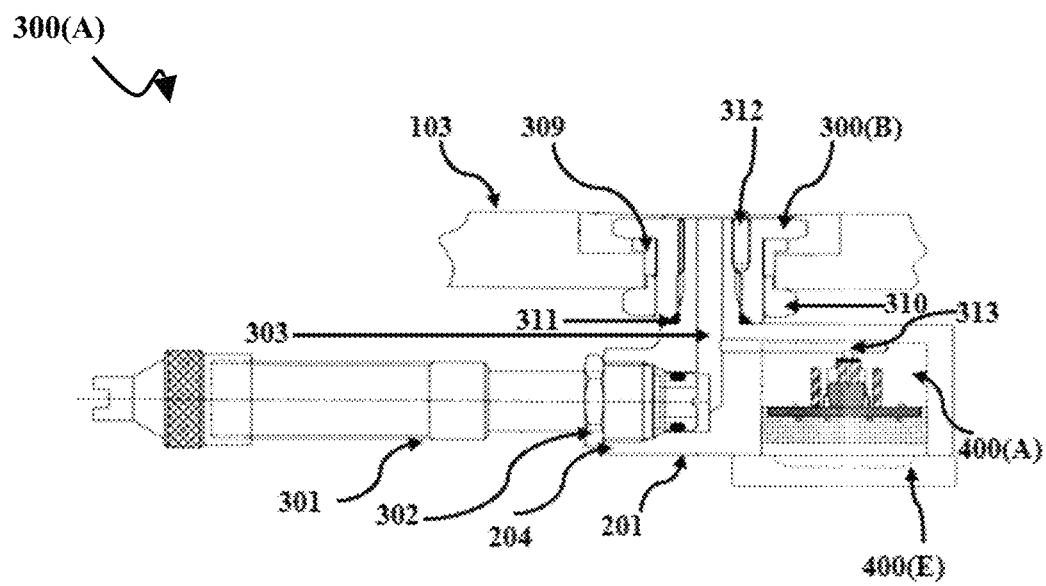
FIG. 3(A) illustrates a cross sectional view of the adapter showing connection to a standard hole through a spud, according to an embodiment of the present invention herein.
FIG. 3(B) illustrates a sectional view of the spud, according to an embodiment of the present invention herein.
Figure 3:
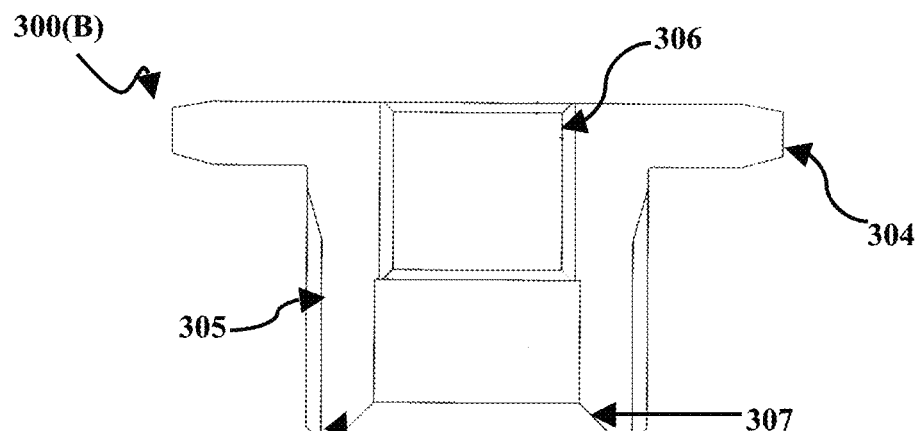
Figure 4:
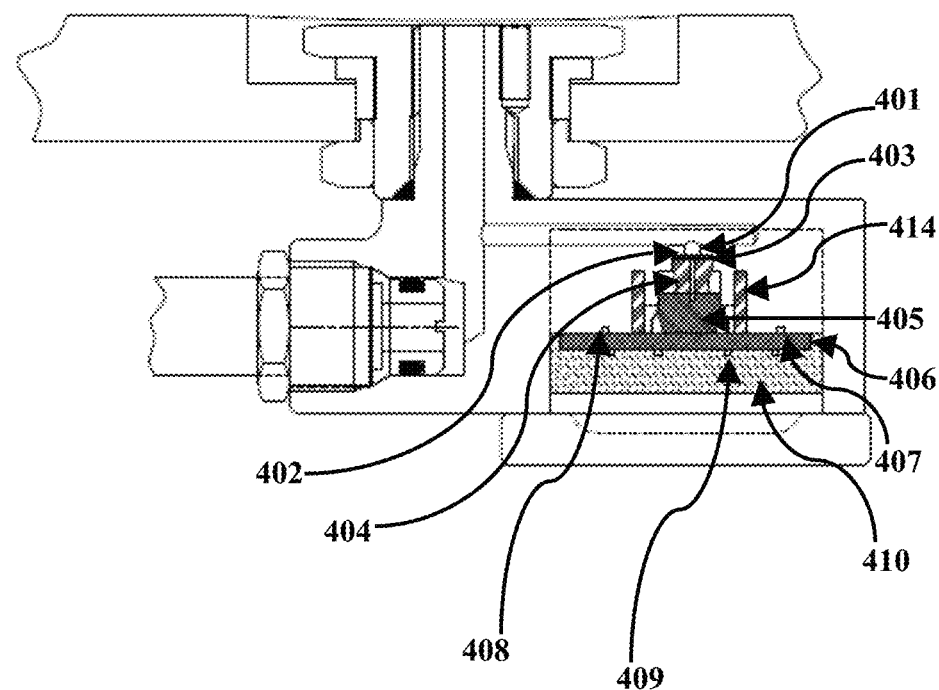
FIG. 4(A) illustrates an orthographic sectional view of the adapter showing a sensor module compartment, according to an embodiment of the present invention herein.
FIG. 4(B) illustrates an orthographic pictorial view of the adapter, according to an embodiment of the present invention herein.
FIG. 4(C) illustrates a sectional view of the adapter showing a section A-A of FIG. 4(B), according to an embodiment of the present invention herein.
FIG. 4(D) illustrates a sectional view of the sensor module compartment showing a section B-B of FIG. 4(B), according to an embodiment of the present invention herein.
FIG. 4(E) illustrates an orthographic sectional view of a sensor housing showing a battery compartment and connection between the battery compartment and the sensor module compartment, according to an embodiment of the present invention herein.
FIG. 4(F) illustrates a sectional view of the battery compartment showing a section C-C of FIG. 4(B), according to an embodiment of the present invention herein.
FIG. 4(G) illustrates a sectional view of the battery compartment showing a section D-D of FIG. 4(B), according to an embodiment of the present invention herein.
Figure 4:
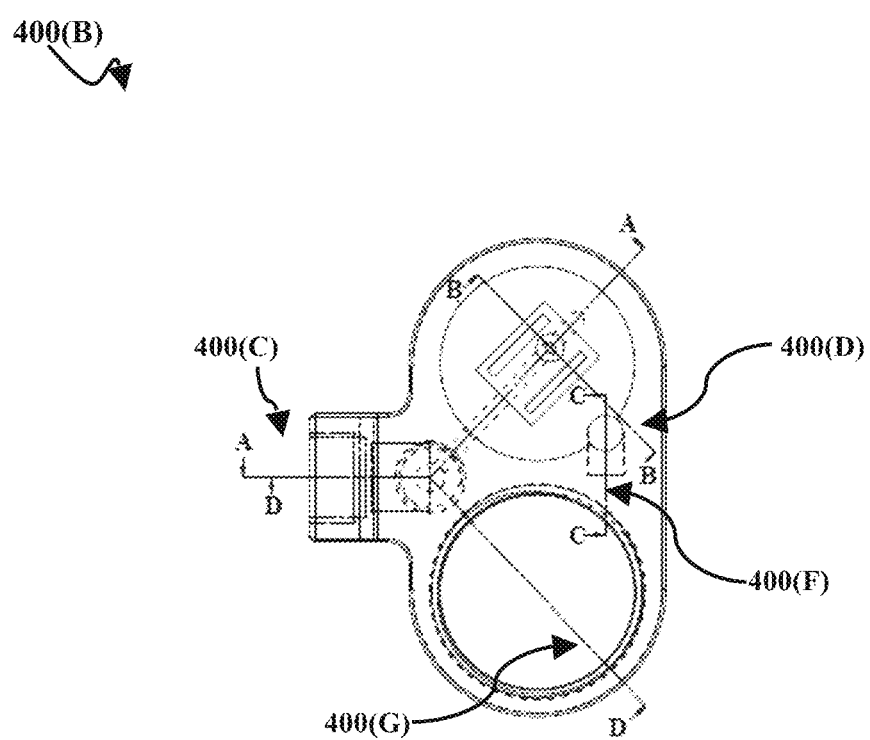
Figure 4:
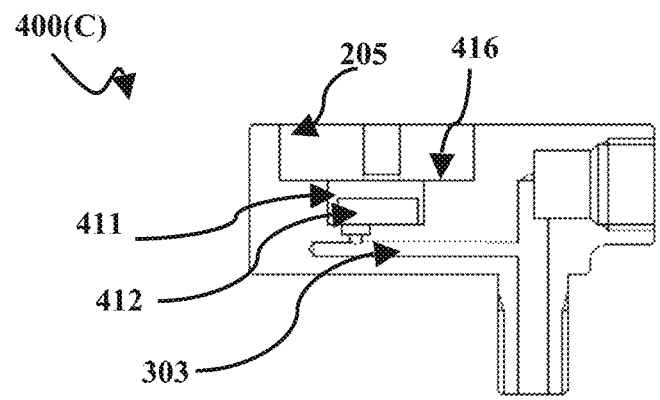
Figure 4:
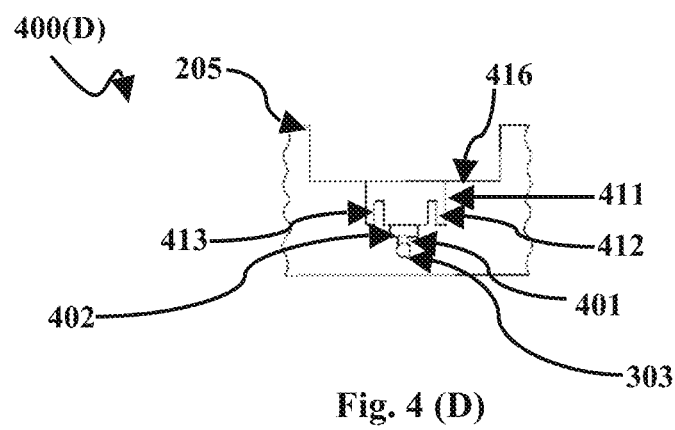
Figure 4:
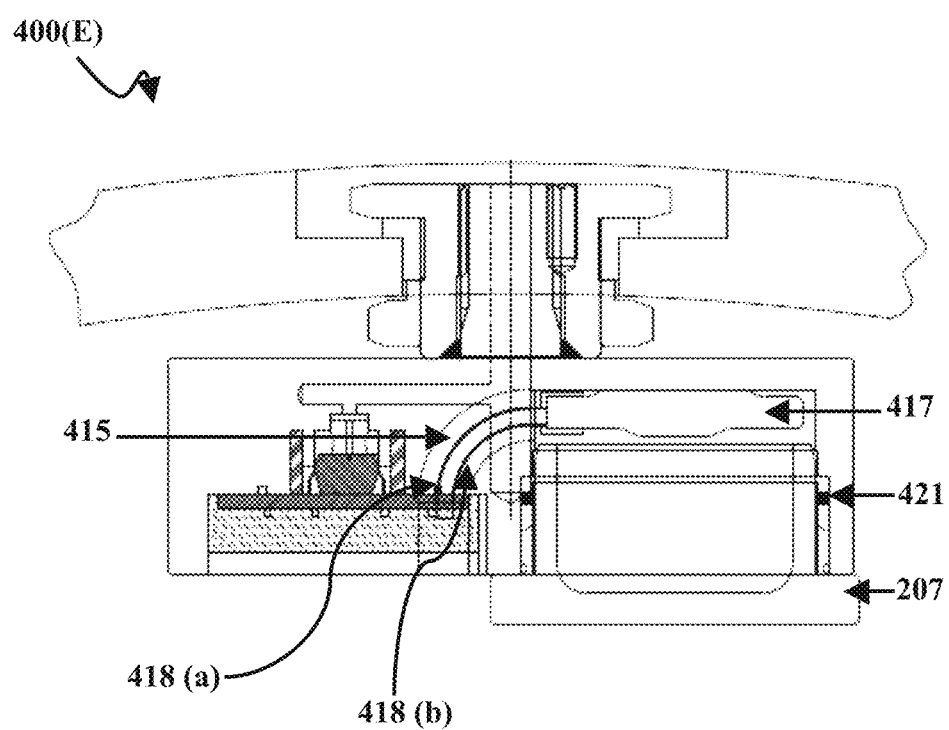
Figure 4:
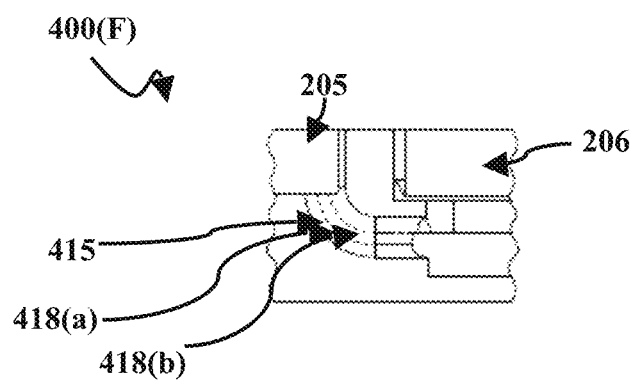
Figure 4:
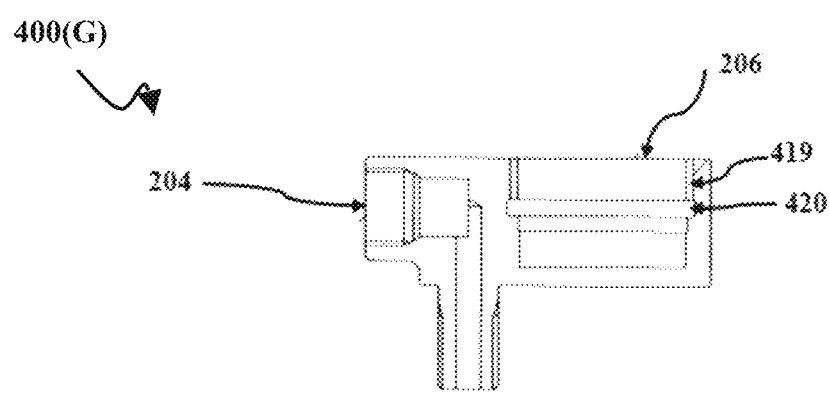

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need to develop an adapter for monitoring tire pressure level of an off-highway vehicle wheel and/or earthmoving vehicle wheel through wireless communication. The embodiments herein achieve this by providing a simple, relatively less expensive adapter with an anti-theft protection for monitoring tire pressure level of an off-highway vehicle wheel and/or earthmoving vehicle wheel that are mounted to a standard hole of a rim. Further, the adapter is convenient to use in any off-highway vehicle wheel and/or earth moving vehicle wheel without being damaged during tire installation. Referring now to the drawings, and more particularly to FIG. 1 through FIG. 5, where similar reference characters denote corresponding features consistently throughout the figures, there are shown preferred embodiments.

FIG. 1 illustrates a cross section view 100 of a rim 103, according to an embodiment of the present invention. The cross section view 100 of the rim 103 includes a tire 101, a tire cavity 102, an adapter 104 and a standard hole 105. The cross section view of the rim 103 that is installed with the adapter 104 clearly illustrates position of the adapter 104 onto the rim 103. According to an embodiment, a sensor module of the adapter 104 is kept external to the rim 103 and away from the tire cavity 102, so that there is no blocking of RF signals by steel belts embedded inside the tire 101. To describe explicitly, the adapter is an internally mounted external tire pressure monitoring (TPM) device.

FIG. 2(A) illustrates a pictorial view 200(A) of an adapter 104, according to an embodiment of the present invention. An adapter 104 for monitoring tire 101 pressure level of an off-highway vehicle wheel or earthmoving vehicle wheel through wireless communication, wherein said adapter 104 comprises of a sensor housing 201, wherein said sensor housing 201 includes a sensor module, an internal gallery and a battery. According to an embodiment, the sensor housing 201 further includes a male portion with external threads 203 for mounting said adapter 104 in a standard hole 105 of a rim 103 to face the tire cavity region 102 of the rim 103 and a female threaded hole arrangement 204 to receive a valve core housing and/or a tire inflation valve. According to an embodiment, the sensor housing 201 further includes at least two compartments for embedding the sensor module 205 and the battery 206 separately.

FIG. 2(B) illustrates a pictorial view 200(B) of the adapter 104, according to an embodiment of the present invention. According to an embodiment, the male portion 202 of the sensor housing 201 is provided with external threads 203 for mounting the adapter 104 in the standard hole 105 of the rim 103 to face the tire cavity region 102 of the rim 103. According to an embodiment, the battery compartment 206 is covered with a threaded lid 207.

FIG. 3(A) illustrates a cross sectional view 300(A) of the adapter 104 showing connection to a standard hole 105 through a spud 304, according to an embodiment of the present invention. The adapter 104 comprises of a sensor housing 201, wherein said sensor housing 201 includes a sensor module, an internal gallery 303 and a battery. The sensor housing 201 further includes a male portion 202 with external threads 203 for mounting the adapter 104 in the standard hole 105 of the rim 103 to face the tire cavity region 102 of the rim 103 and the female threaded hole arrangement 204 to receive a valve core housing 301 and/or a tire inflation valve. According to an embodiment, the internal gallery 303 is provided to establish connectivity between the sensor module, the tire inflation valve and the tire cavity 102.

According to an embodiment, the valve core housing 301 and/or the tire inflation valve is pushed inside the female threaded hole arrangement 204 of the sensor housing 201. The valve core housing 301 and/or the tire inflation valve includes a swivel nut 302 for establishing a tight seal between the valve core housing 301 and/or the tire inflation valve and the female threaded hole arrangement 204 of the sensor housing 201. The valve core housing 301 may include but not limited to different configurations such as angled stem, curved stem, hook shaped stem to match requirement of practical conditions.

According to an embodiment, the adapter 104 is connected to the standard hole 105 of the rim 103 through a spud 304. The standard hole 105 with a larger diameter is made to face the air cavity region 102 of the rim 103. The size of the standard hole 105 is same as that for receiving the spud 304. This is to ensure that the adapter 104 can be retro-fit at the field when the customer decides so. According to an embodiment, the spud 304 includes internal threads to receive external threads 203 of the male portion 202 of the sensor housing 201 and external threads to match internal threads of a lock nut 310 provided beneath the spud 304.

The adapter 104 is entered into the spud 304 by allowing the external threads 203 of the sensor housing 201 to face the tire cavity 102 region of the rim 103 and thereby secured by driving a set screw 312 at a mating thread interface between the spud 304 and external threads 203 of the sensor housing 201. This is to prevent unauthorised removal of the sensor in the field as the disassembly of sensor housing 201 is possible only after the removal of the tire 101 which is done by authorised personnel. According to an embodiment, a seal 311 is disposed at a chamfer of the spud 304 to provide an air tight seal between the spud 304 and the sensor housing 201 interface and a rubber grommet 309 is placed over an external step of the spud 304.

FIG. 3(B) illustrates a sectional view 300(B) of the spud 304, according to an embodiment of the present invention. The external threads 203 of the sensor housing 201 is entered completely into the spud 304 in such a way that the both the male portion 202 of the sensor housing 201 and a mating surface 308 of the spud 304 touches each other. The spud 304 includes internal threads 306 to receive the external threads 203 of the male portion 202 of the sensor housing 201 and external threads 305 to match internal threads of a lock nut 310 provided beneath the spud 304. A seal 311 is disposed at the chamfer 307 of the spud 304 to provide an air tight seal between the spud 304 and the sensor housing 201 interface.

FIG. 4(A) illustrates an orthographic sectional view 400 (A) of the adapter 104 showing a sensor module compartment 205, according to an embodiment of the present invention. The sensor housing 201 is a casing that includes separate compartments for embedding the sensor module and the battery.

According to an embodiment, the sensor module compartment 205 includes a stepped hole 401, a grommet 404, a filter 403, a rectangular recess 411, a sealing element 414 and sensor electronic parts. According to an embodiment, the sensor electronic parts includes a microcontroller with plurality of sensor and/or sensor chip 405, an antenna 409, a radio frequency matching circuit 408, a signal conditioning unit 407, leads for connecting to said battery 418 (a, b) and a common printed circuit board (406). According to an embodiment, the sensor module compartment 205 is connected to a cross hole 313 provided in the internal gallery 303 through the stepped hole 401 provided at top of the sensor module compartment 205.

According to an embodiment, the filter 403 and the grommet 404 are attached and connected together to a counter bore 402 of the stepped hole 401 and thereby providing tight seal and protection for the sensor electronic parts from contaminants present in the inflated air.

According to the embodiment, the plurality of sensors configured to display an individual tire pressure, temperature and other values on a panel. The pressure sensor, the acceleration sensor, the temperature sensor and the battery level sensor are housed in the microcontroller 405 with a sensor chip positioned directly facing the cross hole of the internal gallery 303 for connecting with the air inside of the tire cavity 102. The microcontroller with plurality of sensors or sensor chip 405, the radio frequency matching circuit 408 and the signal conditioning unit 407 are mounted on the common printed circuit board 406 on a side facing the said cross hole 313 and the antenna 409 positioned on other side of the printed circuit board 406 and together mounted over a surface 416 inside the sensor module compartment 205 and potted using a suitable epoxy based resin 410.

FIG. 4(B) illustrates an orthographic pictorial view 400 (B) of the adapter 104, according to an embodiment of the present invention herein. FIG. 4(C) illustrates a sectional view 400(C) of the adapter 104 showing a section A-A of FIG. 4(B), according to an embodiment of the present invention. The positioning of the rectangular recess 411 and at least two ribs 412 in the sensor module compartment 205 is clearly shown.

FIG. 4(D) illustrates a sectional view 400(D) of the sensor module compartment 205 showing a section B-B of FIG. 4(B), according to an embodiment of the present invention. According to an embodiment, the rectangular recess 411 provided along boundary of the grommet 404 and the microcontroller 405 and thereby acts as a protective frame for the microcontroller 405. According to an embodiment, at least two ribs 412 rise vertically from bottom of the rectangular recess 411 creating a gap 413 along walls of the rectangular recess 411 and allows positioning of the sealing element 414 into the gap 413 and thereby preventing the epoxy based resin 410 entering the rectangular recess 411.

FIG. 4(E) illustrates an orthographic sectional view 400 (E) of a sensor housing 201 showing a battery compartment 206 and connection between the battery compartment 206 and the sensor module compartment 205, according to an embodiment of the present invention. According to an embodiment, said battery compartment 206 includes a battery 417, an internal thread and a groove. According to an embodiment, the groove is provided beneath said internal thread to receive a static seal 421.

FIG. 4(F) illustrates a sectional view 400(F) of the battery compartment 206 showing a section C-C of FIG. 4(B), according to an embodiment of the present invention. According to an embodiment, the leads 418 (a, b) for connecting to said battery 417 are taken from said printed circuit board 406 and run through an internal hole 415 connecting said sensor compartment 205 and said battery compartment 206.

FIG. 4(G) illustrates a sectional view 400(G) of the battery compartment 206 showing a section D-D of FIG. 4(B), according to an embodiment of the present invention. According to an embodiment, an internal thread 419 is provided for receiving a threaded lid 207. A groove 420 is provided beneath said internal thread 419 to receive a static seal 421. By this arrangement, the battery 417 replacement can be done by removing the threaded lid 207 without removal of the tyre 101.

Figure 5:
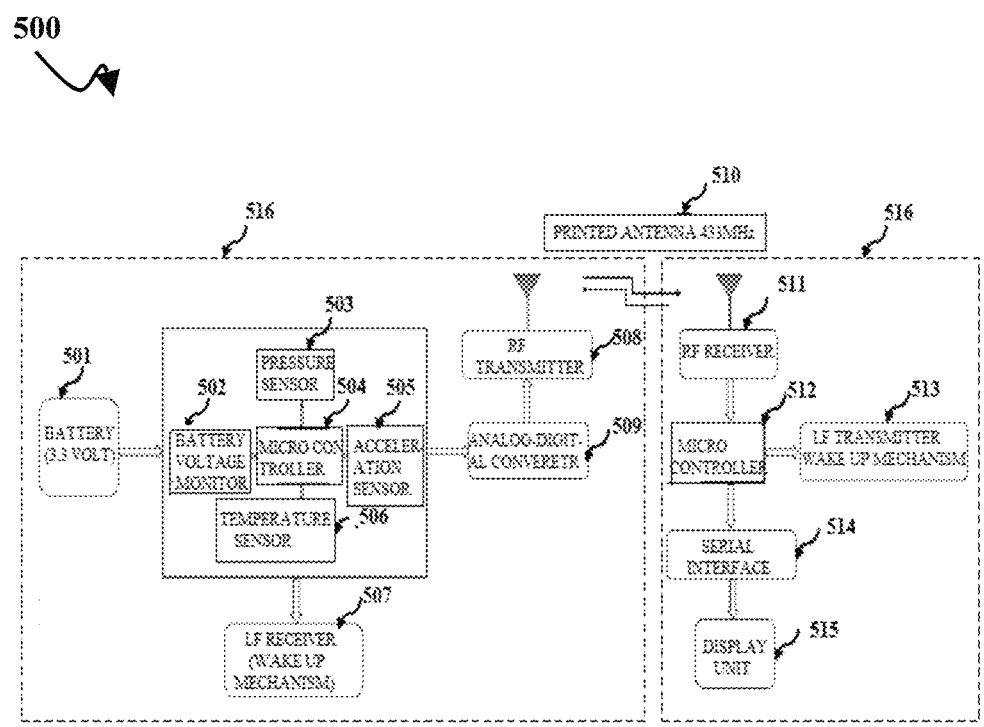
FIG. 5 illustrates a block diagram of wireless communication in a microcontroller of the sensor module compartment of the adapter, according to an embodiment of the present invention herein.

FIG. 5 illustrates a block diagram 500 of wireless communication in the microcontroller of the TPM adapter 104, according to an embodiment of the present invention. According to an embodiment, the transmitter unit 516 configured to transmit measured values from the plurality of sensors to a receiver unit 517 for sending alert signals to a driver or operator. According to an embodiment, the transmitter unit 516 integrates a microcontroller 504, a pressure sensor 503, an acceleration sensor 505, a digital signal processing ASIC (Application Specific Integrated Circuit) chip and an antenna 510. The transmitter unit 516 further includes a highly-integrated monolithic with low-voltage power supply or battery 501 and a wireless FSK/ASK (Frequency Shift Keying/Amplitude Shift Keying) UHF (Ultra High Frequency) transmitter or RF transmitter 508. According to an embodiment, the pressure sensor 503 is produced by Micro Electro Mechanical System (MEMS) technology. According to an embodiment, the ASIC chip includes a temperature sensor 506, an internal clock, an analog to digital converter (ADC) 509, sampling/holding (S/H), SPI (Serial Peripheral Interface), sensor data calibration, data management, ID code and battery voltage monitor circuit 502. The battery voltage monitors circuit 502 provides a signal proportional to the supply voltage. The voltage is read by the ADC 509 referenced to a fixed (band gap) voltage. Function of acceleration sensor 505 is to sense if the vehicle is in motion or at rest.

According to the embodiment, a pressure/temperature importing hole left on one side of IC facing the internal gallery 303 in the sensor housing 201 directly imports pressure into a stress film of pressure sensor 503 and ambient temperature into the temperature sensor 506. The sensor module has good long-term properties and protected from the harsh environment conditions. The pressure measurement is performed by a dedicated ROM library function. According to an embodiment, the module operates in a temperature range from −40° C. to +125° C., a pressure range from 100 kpa to 1800 kpa and a supply voltage range from 1.9 V up to 3.6 V. According to an embodiment, the pressure sensor 503 is provided with thermal shutdown mode for device protection at high temperatures. Measurements of pressure, acceleration, temperature, and battery voltage are performed under software control, and the data can be formatted and prepared for RF (Radio Frequency) transmission by the microcontroller 504. In transmitter unit 516 filter capacitances are configured in order to suppress noise and improve reliability since RF chip is very sensitive to electromagnetic noise of vehicle. According to an embodiment, a high working frequency of system is 433 MHz, load capacitance is 8 pF and thereby a 18.08 MHz passive crystal is selected.

According to the embodiment, the transmitter unit 516 may further include an intelligent wakeup mechanism (507 & 513) internally configured to reduce power consumption and an interval timer configured to control a timing of measurements and transmissions. The circuitry (not shown) is programmed to wake up at regular intervals or it can be woken up by the integrated LF transmitter 813. Additionally, wakeup is possible by an external wakeup source circuitry (not shown) connected to a general purpose Input/output (GPIO) pins. Fine tuning of the centre frequency is done either using the on-chip capacitors bank or adding external capacitors. A ROM library function is able to start up the crystal and can select it as clock source for a baud rate generator. Data bytes can be shifted to Special Function registers which automatically can enable the RF power amplifier (PA) pin and can transmit the desired data according to the configuration. After the transmissions are finished the PA pin is disabled automatically. The highly efficient power amplifier is automatically turned on by the Manchester/Bi Phase encoder as soon as data is written to a register. After the last bit is transmitted and the shift register is empty the PA is turned off again.

According to the embodiment, the receiver unit 517 is highly integrated receiver chip for 433 MHz frequency. It is a family of universal, highly sensitive, low power, ASK/FSK RF multi-channel receivers for Manchester-coded data signals. It is able to run in several autonomous self-polling and wakeup modes. The chips include fully integrated digital base band data processing and produce clean data output via SPI, thus significantly reducing the load on the host processor and standby power consumption. The receiver unit communicates to the sensor through 433 MHz antenna and receives and scan the signals from the sensor unit for useful data. The received data can be scanned for certain message contents (IDs) and is stored as data buffer, accessible via the SPI host interface. The converted data can be sent to display unit 515 to display the tire pressure, temperature and other parameters namely acceleration, battery level as needed.

The main advantage of the present invention is that the adapter is mounted on a standard hole of a rim in such a way by placing a sensor module outside a tire cavity for monitoring tire pressure of an earthmoving or off-highway vehicle wheel.

Another advantage of the present invention is that the adapter provides an anti-theft protection to the sensor module.

Further advantage of the present invention is that the adapter utilizes a reliable RF signal transmission from the sensor module without a need for an external antenna as the sensor module are placed outside the tire cavity.

Additional advantage of the present invention is that the adapter has a hassle free assembly.

Another advantage of the present invention is that the adapter allows a user to remove the tire easily over the rim without any damage to the sensor module.

Another advantage of the present invention is that the adapter facilitates easy tire rotation without the need for location sensing of tires.

Another advantage of the present invention is that the adapter facilitates easy removal and replacement of the battery without the need for removal of tires.

Another advantage of the present invention is that the adapter provides a female threaded hole arrangement to receive a valve core housing and/or tire inflation valve and thereby eliminating the need for separate holes on the rim for holding the TPM adaptor and the tire inflation valve.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. An adapter 104 for monitoring tire 101 pressure level of an off-highway vehicle wheel and/or earthmoving vehicle wheel through wireless communication, wherein said adapter 104 comprises of, a sensor for measuring pressure of said vehicle wheel tire 101;

characterized in that said adapter 104 further includes a sensor housing 201, wherein said sensor housing 201 includes a sensor module, an internal gallery 303 and a battery 417;

wherein said sensor housing 201 further includes a male portion 202 with external threads 203 for mounting said adapter 104 in a standard hole 105 of a rim 103 to face tire cavity region 102 of said rim 103, a female threaded hole arrangement 204 to receive a valve core housing 301 and/or a tire inflation valve;

wherein said internal gallery 303 provided to establish connectivity between said sensor module, said tire inflation valve and said tire cavity 102;

wherein said sensor housing 201 further includes at least two compartments for embedding said sensor module 205 and said battery 206 separately; and wherein said battery compartment 206 includes a battery 417, an internal thread 419 for receiving a threaded lid 207 and a groove 420 provided beneath said internal thread 419 to receive a static seal 421.

2. The adapter as claimed in claim 1, wherein said sensor module compartment 205 includes a stepped hole 401, a grommet 404, a filter 403, a rectangular recess 411, a sealing element 414 and sensor electronic parts;

wherein said sensor electronic parts includes a microcontroller with plurality of sensor and/or sensor chip 405, an antenna 409, a radio frequency matching circuit 408, a signal conditioning unit 407, leads for connecting to said battery 418 (*a, b*) and a common printed circuit board (406).

3. The adapter as claimed in claim 2, wherein said sensor module compartment 205 is connected to a cross hole 313 provided in said internal gallery 303 through said stepped hole 401 provided at top of said sensor module compartment 205.

4. The adapter as claimed in claim 2, wherein said filter 403 and said grommet 404 are attached and connected together to a counter bore 402 of said stepped hole 401 and thereby providing tight seal and protection for said sensor electronic parts from contaminants present in said inflated air.

5. The adapter as claimed in claim 4, wherein said microcontroller with plurality of sensors or sensor chip 405, said radio frequency matching circuit 408, and said signal conditioning unit 407 are mounted on said common printed circuit board 406 on a side facing said cross hole 313 and said antenna 409 positioned on other side of said printed circuit board 406 and together mounted over a surface 416 inside said sensor module compartment 205 and potted using a suitable epoxy based resin 410.

6. The adapter as claimed in claim 2, wherein the rectangular recess 411 provided along boundary of said grommet 404 and said microcontroller 405 and thereby acts as a protective frame for said microcontroller 405.

7. The adapter as claimed in claim 5, wherein at least two ribs 412 rise vertically from bottom of said rectangular recess 411 creating a gap 413 along walls of said rectangular recess 411 and allows positioning of said sealing element 414 into said gap 413 and thereby preventing said epoxy based resin 410 entering said rectangular recess 411.

8. The adapter as claimed in claim 2, wherein said leads for connecting to said battery 418 (a, b) are taken from said printed circuit board 406 and run through an internal hole 415 connecting said sensor compartment 205 and said battery compartment 206.

9. The adapter as claimed in claim 1, wherein said valve core housing 301 and/or said tire inflation valve includes a swivel nut 302 for establishing a tight seal between said valve core housing 301 and/or said tire inflation valve and said female threaded hole arrangement 204 of said sensor housing, 201.

10. The adapter as claimed in claim 1, wherein said adapter 104 is connected to said standard hole 105 of said rim 103 through a spud 304; wherein said spud 304 includes internal threads 306 to receive said external threads 203 of said male portion 202 of said sensor housing 201 and external threads 305 to match internal threads of a lock nut 310 provided beneath said spud 304.

11. The adapter as claimed in claim 10, wherein said adapter 104 is entered into said spud 304 and secured by driving a set screw 312 at a mating thread interface between said spud 304 and external threads 203 of said sensor housing 201.

12. The adapter as claimed in claim 11, wherein a seal 311 is disposed at a chamfer 307 of said spud 304 to provide an air tight seal between said spud 304 and said sensor housing 201 interface and a rubber grommet 309 is placed over an external step of the spud 304.

\* \* \* \* \*